United States Patent Office 2,891,917
Patented June 23, 1959

2,891,917

ADHESIVE COMPOSITIONS

Derek William Sear, Birmingham, and Alan Paul Osborne, Yardley, Birmingham, England, assignors to Dunlop Rubber Company Limited, London, England, a British company No Drawing. Application July 5, 1955
Serial No. 520,122

Claims priority, application Great Britain
July 5, 1954

6 Claims. (Cl. 260—17)

This invention relates to adhesive compositions and to the bonding of surfaces with such compositions.

Adhesive compositions have been prepared in the past from solutions of natural rubber or of certain synthetic rubbery polymers but such adhesives are either unsuitable for some applications or require lengthy and complicated processing in their manufacture.

We have now found that certain adhesive compositions based on rubbery copolymers of butadiene and methyl isopropenyl ketone are relatively easy to process and when used as adhesives possess a high bond strength.

According to the present invention an adhesive composition comprises in admixture a butadiene-methyl isopropenyl ketone copolymer and a cellulose derivative. When used as adhesives the copolymer and cellulose derivatives are preferably dispersed in a volatile organic solvent.

The copolymer preferably contains from 60 to 80 percent of butadiene and 40 to 20 percent of methyl isopropenyl ketone, for example 70 parts of butadiene and 30 parts of methyl isopropenyl ketone. Best results have been obtained with copolymers having a high Mooney viscosity, for example greater than 100.

The cellulose derivatives which can be used include the cellulose esters, such as cellulose nitrate and the cellulose carboxylic acid esters such as cellulose acetate. Cellulose ethers, such as benzyl cellulose, can also be used.

The proportions of the copolymer and cellulose derivative may be varied over a wide range but, generally speaking, the amount of such derivative should be from 25 percent to 75 percent, by weight, of the composition. Good results are obtained when the proportions used are approximately equal.

The organic solvent used should be volatile at ordinary temperatures or with slight heating and capable of dispersing, preferably dissolving, both the copolymer and the cellulose derivative. The nature and proportions of the solvent can be varied according to the composition of the adhesive and the purpose for which it is to be used. A wide variety of solvents is available and good results have been obtained using volatile ketones, such as methyl ethyl ketone, volatile esters, such as ethyl acetate, and mixtures of these substances.

The adhesive composition may be used in the form of a solution of the coploymer and cellulose derivative only but for some applications it is preferable to incorporate fillers or curing ingredients, or both, in the composition. The fillers which can be used include carbon black and inorganic fillers, such as calcium silicate, silica and zinc oxide. The proportion of filler may be varied considerably and, in some cases, as much as 4 times the weight of the copolymer may be used. The preferred fillers are those which have a reinforcing effect on the composition.

The curing ingredients which can be added include sulphur and vulcanisation accelerators, such as xanthates and dithiocarbamates. If desired, the accelerator can be dispersed in a separate medium or in one or more components of the composition and added to the remainder shortly before use.

The adhesive compositions may contain mixtures of cellulose derivatives and also additional ingredients which increase the degree of adhesion obtainable. Examples of such ingredients are phenolformaldehyde resins, polyvinyl resins, chlorinated rubber, lime-hardened rosin and zinc resinate. Suitable phenol-formaldehyde resins are the incompletely condensed resins such as xylenol-formaldehyde resins of the novolak type. Suitable polyvinyl resins are the polyvinyl esters and copolymers of vinyl esters with one or more compounds co-polymerisable therewith. Polyvinyl acetals can also be used. Examples of these and other compounds which can be mixed with butadienemethyl isopropenyl ketone copolymers to give compositions suitable for use as adhesives are given in our co-pending applications Ser. No. 520,121, filed July 5, 1955, and Ser. No. 520,123, filed July 5, 1955.

The adhesive compositions of this invention can be prepared from polymers of high Mooney viscosity, i.e. of high molecular weight, whereas other synthetic rubbers of similar molecular weight cannot readily be used since they are much more difficult to process. Thus, the butadiene-methyl isopropenyl ketone copolymers can be more easily compounded with vulcanising agents, fillers or other ingredients and the resulting compounds can be dispersed in the volatile solvents with a relatively small amount of mastication. As a result of this adhesive films are obtained which are tougher than can be obtained by using natural rubber or other synthetic rubbers.

The adhesive compositions of this invention can be used for bonding surfaces of wood, leather, plastic, glass and metal. Many of the compositions can be allowed to dry out on a surface by evaporation of the solvent and then reactivated by heat immediately prior to bringing the coated surface into contact with another surface which is to be joined thereto.

The invention is illustrated by the following examples of adhesive compositions, all parts being by weight. In these examples the butadiene-methyl isopropenyl ketone copolymer used was a rubbery copolymer having a Mooney viscosity of 156.5 units and containing 70 parts of butadiene and 30 parts of methyl isopropenyl ketone. Before use, the rubbery copolymer was masticated on a cold mill for 30 minutes to aid dissolution in the solvent.

*Example I*

| | Parts |
|---|---|
| Butadiene-methyl isopropenyl ketone copolymer | 100 |
| Cellulose acetate | 50 |
| Methyl ethyl ketone | 800 |
| Ethyl acetate | 200 |

The copolymer was masticated on a cold mill for 30 minutes and then dissolved in the methyl ethyl ketone. The cellulose acetate was then added, followed by the ethyl acetate and a clear golden brown solution of even consistency was obtained.

Good bonds were obtained to wood, leather and other materials by applying the solution and allowing the solvent to evaporate. The dried-out film was flexible and tough.

*Example II*

| | Parts |
|---|---|
| Butadiene-methyl isopropenyl ketone copolymer | 100 |
| Cellulose nitrate | 72 |
| Methyl ethyl ketone | 1000 |
| Butyl alcohol | 30 |

The copolymer was masticated as in Example I and then dissolved in the methyl ethyl ketone. The cellulose nitrate, which was damped with the butyl alcohol, was then dissolved in the resulting solution of copolymer to give an adhesive of even consistency. Good adhesion was obtained to wood, glass and leather by applying the solution and allowing solvent to evaporate, the resulting film strength being high.

*Example III*

The adhesive was prepared as in Example II with the exception that 50 parts of finely divided calcium silicate were milled into the copolymer before dissolving it in the solvent. The adhesion to glass was somewhat better than with the unfilled adhesive of Example II but the dried-out film was less flexible.

*Example IV*

This example illustrates the use of curatives in the composition. A compound was prepared with the following composition by incorporating the ingredients into the rubbery copolymer on a two roll mill:

| | Parts |
|---|---|
| Butadiene methyl isopropenyl ketone copolymer | 100 |
| Zinc oxide | 5 |
| Sulphur | 2 |
| Stearic acid | 2 |
| Mercaptobenzthiazole | 0.5 |

72 parts of cellulose nitrate containing 30 parts by weight of butyl alcohol were dissolved in a mixture of 1500 parts of methyl ethyl ketone and 500 parts of toluene. When the cellulose nitrate had completely dissolved, the above compound was worked in to form a smooth solution.

Good adhesion was obtained to a variety of surfaces, notably leather and wood, and on heating at 100° C. for 30 minutes to effect cure the bond strength was still higher.

*Example V*

| | Parts |
|---|---|
| Butadiene-methyl isopropenyl ketone cooplymer | 100 |
| Phenolic resin | 100 |
| Nitrocellulose | 100 |
| Methyl ethyl ketone | 1600 |

The phenolic resin used in this example was a novolak type xylenol-formaldehyde resin commercially available under the name Bakelite R–10840. A novolak resin is an incompletely condensed resin in the soluble and/or thermoplastic state.

The adhesive was prepared according to the above formula by milling the resin and the nitrocellulose into the copolymer and dissolving the resulting compound in the methyl ethyl ketone.

The adhesive gave good bonds to wood, glass, duralumin and leather.

Having now described our invention, what we claim is:

1. An adhesive composition comprising in admixture (*a*) a butadiene-methyl isopropenyl ketone rubbery copolymer containing from 60 to 80 percent by weight of butadiene and from 40 to 20 percent by weight of methyl isopropenyl ketone and (*b*) a cellulose ester selected from the group consisting of cellulose acetates and cellulose nitrates, in an amount equal to from 25 percent to 75 percent of the weight of the copolymer.

2. A composition according to claim 1 which comprises in addition a xylenol-formaldehyde resin of the novolak type.

3. A composition according to claim 1 wherein the butadiene-methyl isopropenyl ketone copolymer has a Mooney viscosity greater than 100.

4. A composition according to claim 1 wherein the said copolymer and cellulose ester are dispersed in a volatile organic solvent.

5. A composition according to claim 1 which comprises in addition curing ingredients for the said copolymer.

6. A composition according to claim 1 which comprises in addition finely divided organic filler.

References Cited in the file of this patent

UNITED STATES PATENTS

| | | |
|---|---|---|
| 2,088,577 | Conaway | Aug. 3, 1937 |
| 2,394,375 | Gross | Feb. 5, 1946 |
| 2,532,374 | Shepard et al. | Dec. 5, 1950 |
| 2,669,553 | Schaffel | Feb. 16, 1954 |
| 2,786,044 | Warner et al. | Mar. 19, 1957 |